United States Patent [19]
Ho

[11] Patent Number: 5,549,318
[45] Date of Patent: Aug. 27, 1996

[54] TROLLEY WITH LUGGAGE SECURING DEVICE

[76] Inventor: Ching-Feng Ho, 2F No. 65, Yang-Ming Street, Pan Chiao City, Taipei Hsien, Taiwan

[21] Appl. No.: 137,299

[22] Filed: Oct. 15, 1993

Related U.S. Application Data

[63] Continuation-in-part of Ser. No. 12,508, Feb. 2, 1993, abandoned.

[51] Int. Cl.$^6$ .................................................. B62B 1/14
[52] U.S. Cl. .............................. 280/654; 280/655/47.27
[58] Field of Search .......................... 280/47.28, 47.29, 280/655, 47.26, 654, 652, 651, 47.24, 47.27

[56] References Cited

U.S. PATENT DOCUMENTS

| | | | |
|---|---|---|---|
| 1,428,180 | 9/1922 | More | 280/47.28 |
| 2,673,654 | 3/1954 | Kaufman | 280/47.29 X |
| 3,941,399 | 3/1976 | Peters et al. | 280/47.29 |
| 4,902,187 | 2/1990 | Rouseau | 280/47.27 X |
| 5,024,455 | 6/1991 | Schrecongost | 280/47.26 X |
| 5,120,183 | 6/1992 | Phillips | 280/47.28 X |
| 5,127,664 | 7/1992 | Cheng | 280/655 |
| 5,178,404 | 1/1993 | Chen | 280/655 |
| 5,294,145 | 3/1994 | Cheng | 280/47.28 X |

FOREIGN PATENT DOCUMENTS

| 4465 | 11/1880 | United Kingdom | 280/47.28 |
|---|---|---|---|

*Primary Examiner*—Margaret A. Focarino
*Assistant Examiner*—Michael Mar
*Attorney, Agent, or Firm*—Poms, Smith, Lande & Rose

[57] ABSTRACT

A luggage trolley comprises a lower support member having a first and a second cup members respectively attached to the two ends thereof. A shaft member extends through the lower support member with a pair of wheels respectively mounted on the two ends thereof to rollingly support the lower support member on the ground. A pair of first tubular members are respectively insertedly received within the cup members and extending therefrom. A pair of extension members, each of which is constituted by a second and a third tubular members, are respectively telescopically inserted into the first tubular members. An upper support member is releasably mounted between the upper ends of the first tubular members so as to define a trunk loading area with the first tubular members and the lower support member. On each of the upper and lower support members, a holding member is provided, having an L-shaped cross section to be received within a recess formed on an upper surface or a lower surface of a trunk in order to secure the trunk on the luggage trolley.

1 Claim, 6 Drawing Sheets

5,549,318

TROLLEY WITH LUGGAGE SECURING DEVICE

This application is a continuation-in-part of application, Ser. No. 08/012,508, filed Feb. 2, 1993 now abandoned.

FIELD OF THE INVENTION

The present invention relates generally to a luggage trolley and in particular to a luggage trolley having a fastening device for securing the luggage thereon.

BACKGROUND OF THE INVENTION

For a traveler, the most embarrassing situation is carrying a heavy trunk and rushing from one place to anther. The structural limitation of some of the conventional trunks makes it difficult to provide casters thereon for rollingly support the trunks on the ground. For the other trunks, although there may be casters provided thereon, the casters are very easy to be damaged by the weight of the trunks and the rough ground surface.

To overcome the above-discussed difficulty that the travellers may meet, a variety of luggage trolleys were developed and introduced into the market. The conventional luggage trolley generally comprises an elongated, horizontal support member on which wheels or casters are mounted. A pair of tubular members are attached to the support member at the opposite ends thereof and extending substantially vertically therefrom to provide a loading area for holding the trunk thereon. A handle bar is provided on the upper ends of the tubular members for easy to draw the luggage trolley. The tubular members are usually constructed in a telescoping manner for easy storage when not in use. In some trolleys, a plate-like retaining member may be provided on the lower ends of the tubular members to provide a more secure support to the trunk.

The prevailing of the luggage trolley indeed provides the traveller with a better way to handle the trunk during travelling. However, there is no trunk fastening means provided on the currently-available luggage trolleys so that the traveller has to use a rope or the like to secure the trunk on the luggage trolley. Apparently, this is another difficulty to the travellers, because it may take some time to secure the rope and the rope may be broken or gets loosening during travelling. In light of this fact, it is still inconvenient to use the conventional luggage trolleys.

It is therefore desirable to provide a luggage trolley having trunk fastening means for releasably securing a trunk thereon.

SUMMARY OF THE INVENTION

According to an aspect of the present invention, there is provided a luggage trolley comprises a lower support member having a first and a second cup members respectively attached to the two ends thereof. A shaft member extends through the lower support member with a pair of wheels respectively mounted on the two ends thereof to rollingly support the lower support member on the ground. A pair of first tubular members are respectively insertedly received within the cup members and extending therefrom. A pair of extension members, each of which is constituted by a second and a third tubular members, are respectively telescopically inserted into the first tubular members. An upper support member is releasably mounted between the upper ends of the first tubular members so as to define a trunk loading area with the first tubular members and the lower support member. On each of the upper and lower support members, a holding member is provided, having an L-shaped cross section to be received within a recess formed on an upper surface or a lower surface of a trunk in order to secure the trunk on the luggage trolley.

BRIEF DESCRIPTION OF THE DRAWINGS

The structural and operational characteristics of the present invention and advantages thereof, as compared to the known state of the art, will be better understood from the following description of a preferred embodiment of the present invention, with reference to the attached drawings, wherein.

DETAILED DESCRIPTION OF THE PREFERRED EMBODIMENT

Figure 1:
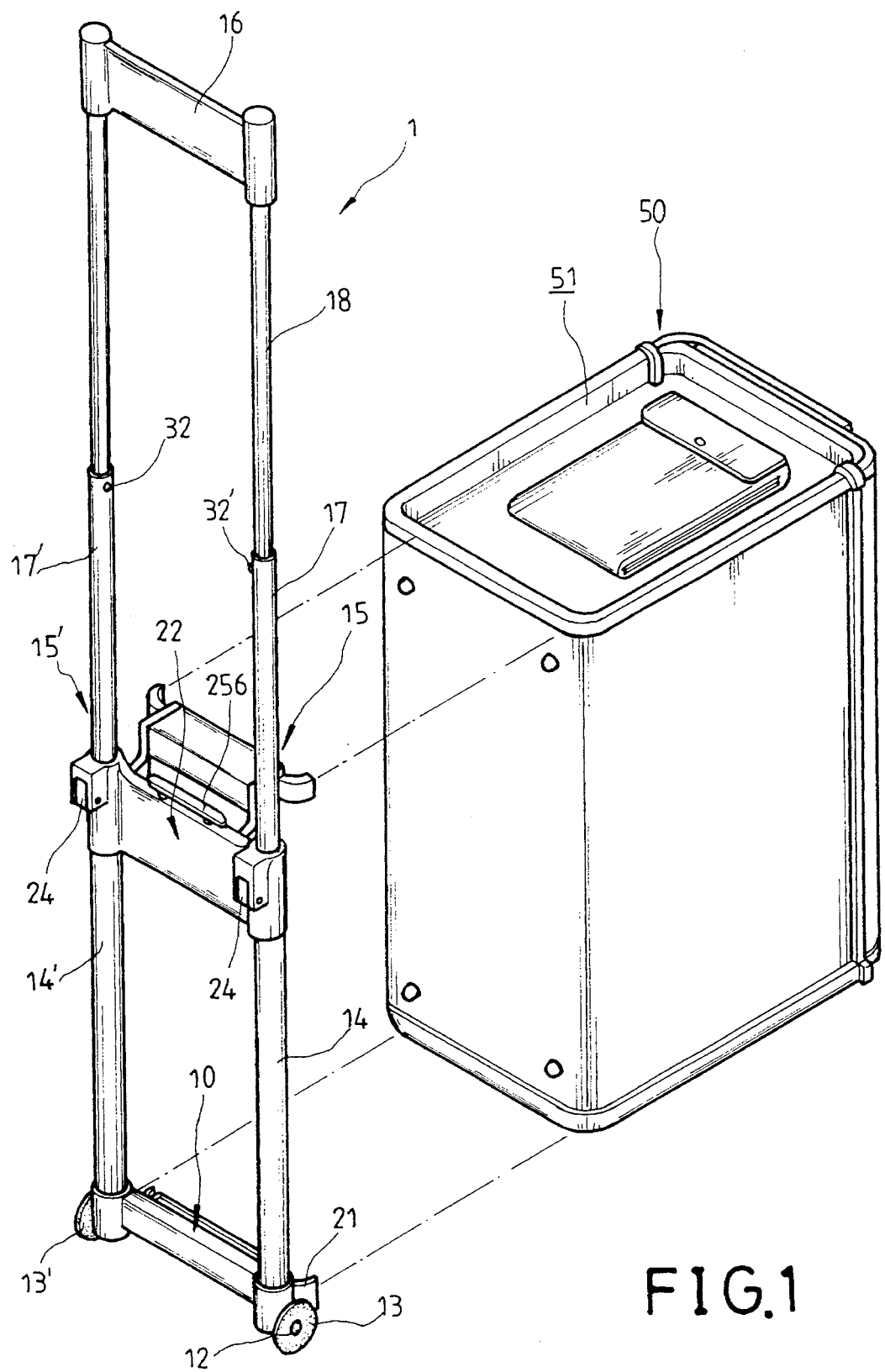
FIG. 1 is a perspective view showing a luggage trolley made in accordance with the present invention with a luggage trunk being detached therefrom to show the detailed structure thereof.

With reference to the drawings and in particular to FIGS. 1–4, wherein a luggage trolley made in accordance with the present invention, generally designated with reference numeral 1 is shown, the luggage trolley 1 comprises an elongated and substantially linear bar member 10, serving as a lower support member of the luggage trolley 1, preferably made of a rigid material, having two ends 101 and 102 respectively having a first and a second cup members 11 and 11' formed thereon. Preferably, the cup members 11 and 11' are integrally formed on the lower support member 10 as a single piece. A shaft member 12 extends through the bar member 10 to rotatably support a pair of wheels 13 and 13' respectively on two ends thereof. The wheels 13 and 13' have a diameter large enough to rollingly support the luggage trolley 1 on the ground and thus allowing the luggage trolley 1 to be movable on the ground by the support of the wheels 13 and 13'.

A pair of elongated side members are respectively received and secured within the first and second cup members 11 and 11' of the lower support member 10 and extending upward therefrom. Each of the side members comprises a first tubular member 14 or 14'. Telescopically received within the first tubular members 14 and 14' are a pair of extension members 15 and 15' each of which is constituted by a second tubular member 17 or 17' into which a third tubular member 18 or 18' is telescopically inserted. In other words, for each of the first tubular members 14 and 14', there are two segments 17, 18 or 17', 18' telescopically inserted therein and there are three segments in total telescopically assembled together for each of the side members.

Figure 2:
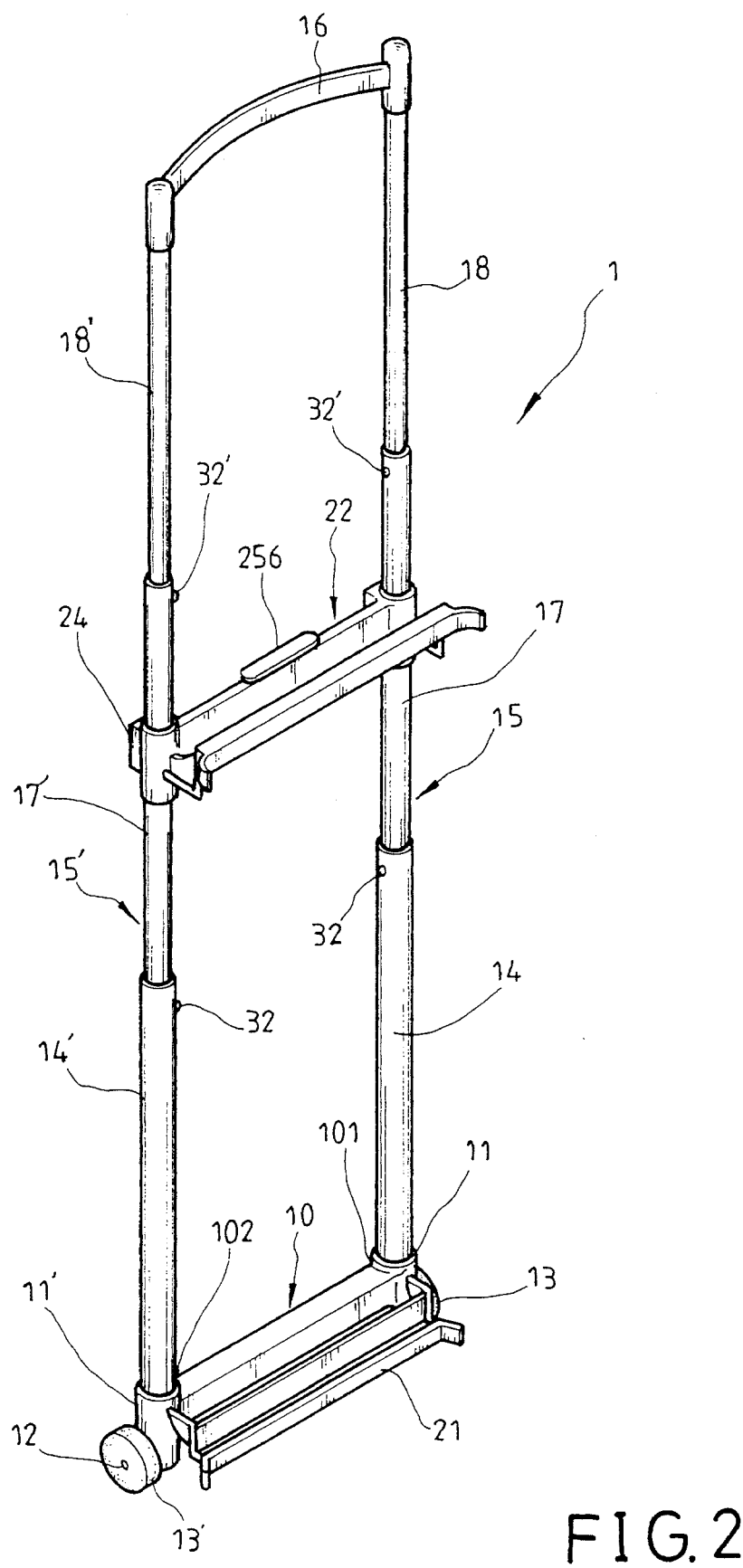
FIG. 2 is also a perspective view showing the luggage trolley of the present invention viewed in a different angle with the trunk being removed.

Retaining means is provided to retain the tubular members in a telescopically extended position, as shown in FIGS. 1 and 2. The retaining means for maintaining the telescope structure in the extended position is known to the art. One of the known retaining means is a spring-biased retaining pin 32 illustrated in FIG. 6. As known to the art, the retaining pin 32 is provided with a round engaging end 321 to penetrate through holes 140 formed on tubular members to secure the tubular members in position. The retaining pin 32 also has a flat support end for supporting thereon the biasing spring 33.

On the remote, free ends of the third tubular members 18 and 18' or the upper ends of the side members, a handle bar 16 is provided straddling over the third tubular members 18 and 18'.

An upper support member 22 which is in the form of an elongated and substantially linear hollow member is releasably mounted between the first tubular members 14 and 14' at the connection between the first tubular members 14, 14' and the second tubular members 17, 17' so that the upper support member 22 is slidable along the second tubular members 17 and 17'.

The upper and lower support member 22 and 10, along with the first tubular members 14 and 14', define a trunk loading area 23 (FIG. 3) for holding a trunk 50 thereon. To secure the trunk 50, there is provided an upper holding member 27 which is in the form of an elongated plate attached to the upper support member 22 in such a manner to provide a substantially L-shaped cross section (see FIG. 4) to be received within an upper recess 51 formed on an upper side of the trunk 50 in order to hold the trunk 50.

Similarly, a lower holding member 21 which is also an elongated plate is attached to the lower support member 10 is such a way to substantially form an L-shaped cross section (see FIG. 4) to be received within a lower recess 52 formed on a lower side of the trunk 50. With the upper and lower holding members 27 and 21 respectively received in the upper and lower recesses 51 and 52 of the trunk 50, the trunk 50 is securely held on the present luggage trolley 1.

Figure 3:
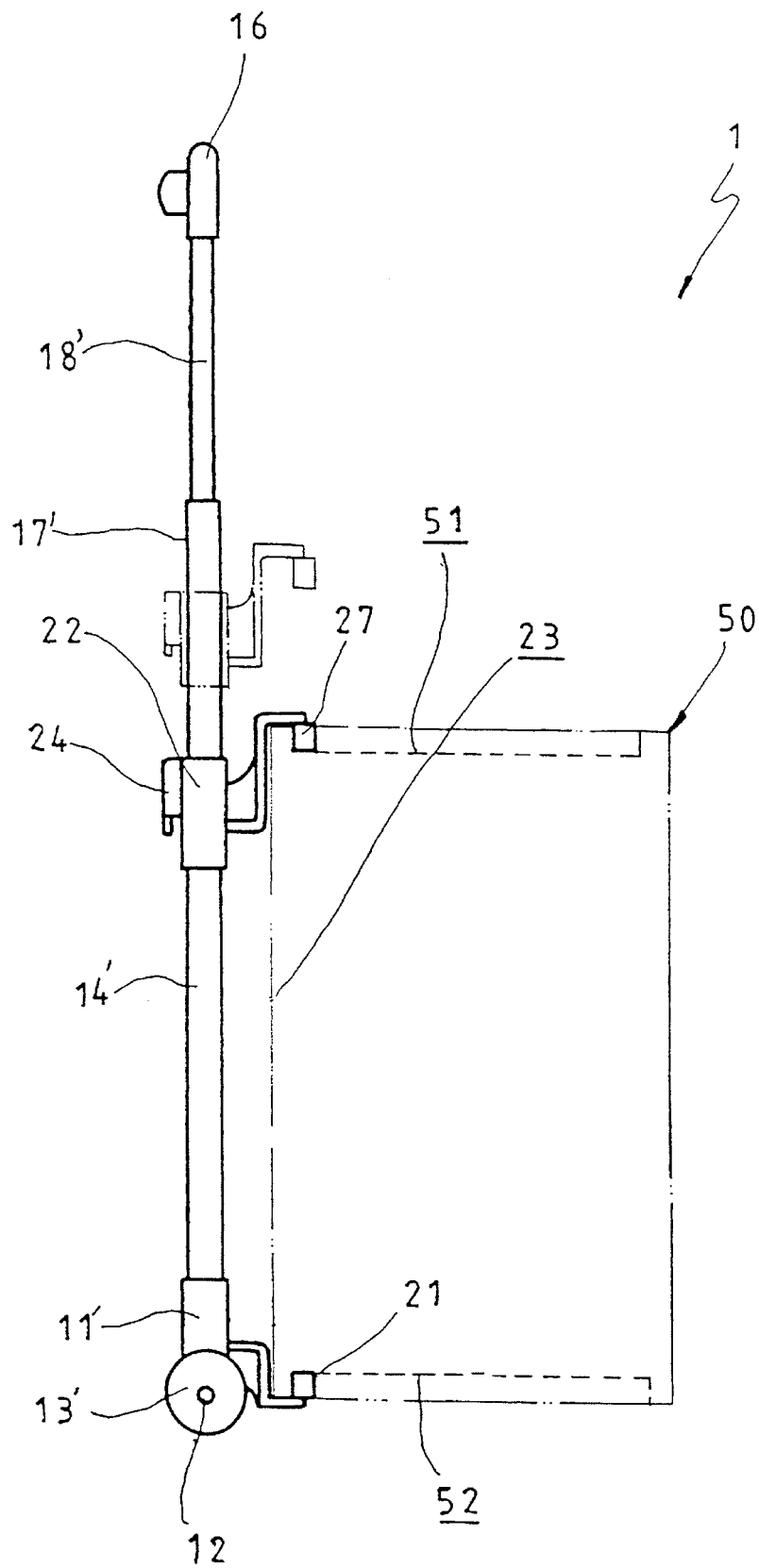
FIG. 3 is a side elevational view of the luggage trolley shown in FIGS. 1 and 2 with the luggage secured thereon.

With the slidability of the upper support member 22, the trunk 20 can be secured by the upper and lower holding members 27 and 21 by first sliding away the upper support member 22 along the second tubular members 17 and 17' to a position where the trunk 50 is free to move in or out of the loading area 23 (the phantom line position shown in FIG. 2), placing the trunk 50 on the lower support member 10 with the lower holding member 21 received within the lower recess 52 of the trunk 50, and moving the upper support member 22 back to have the upper holding member 27 enter the upper recess 51 of the trunk 50 (the solid line position shown in FIG. 3).

Figure 4:
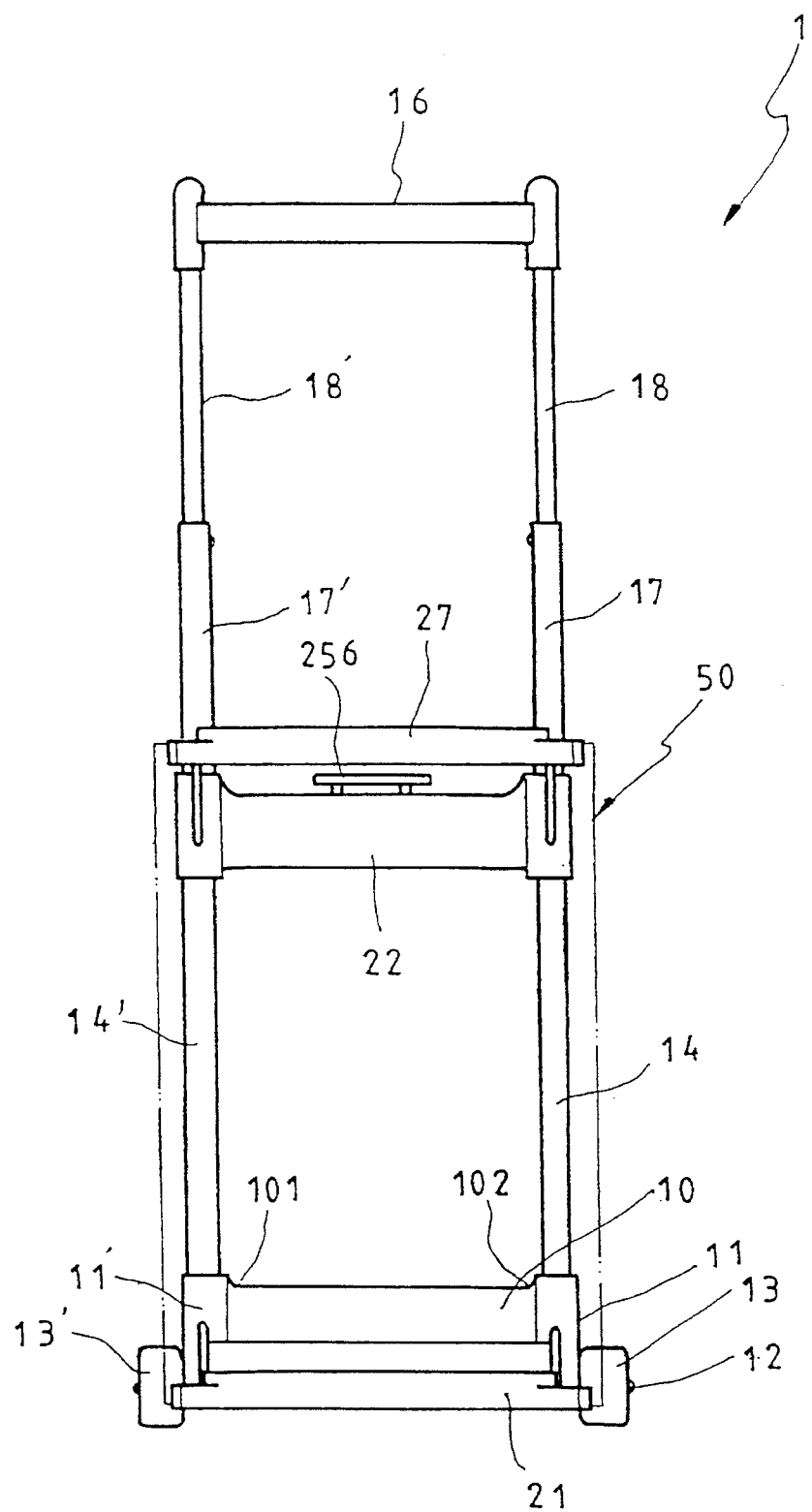
FIG. 4 is a front view of the luggage trolley shown in FIGS. 1 and 2 with the luggage secured thereon but shown in phantom line.
Figure 5:
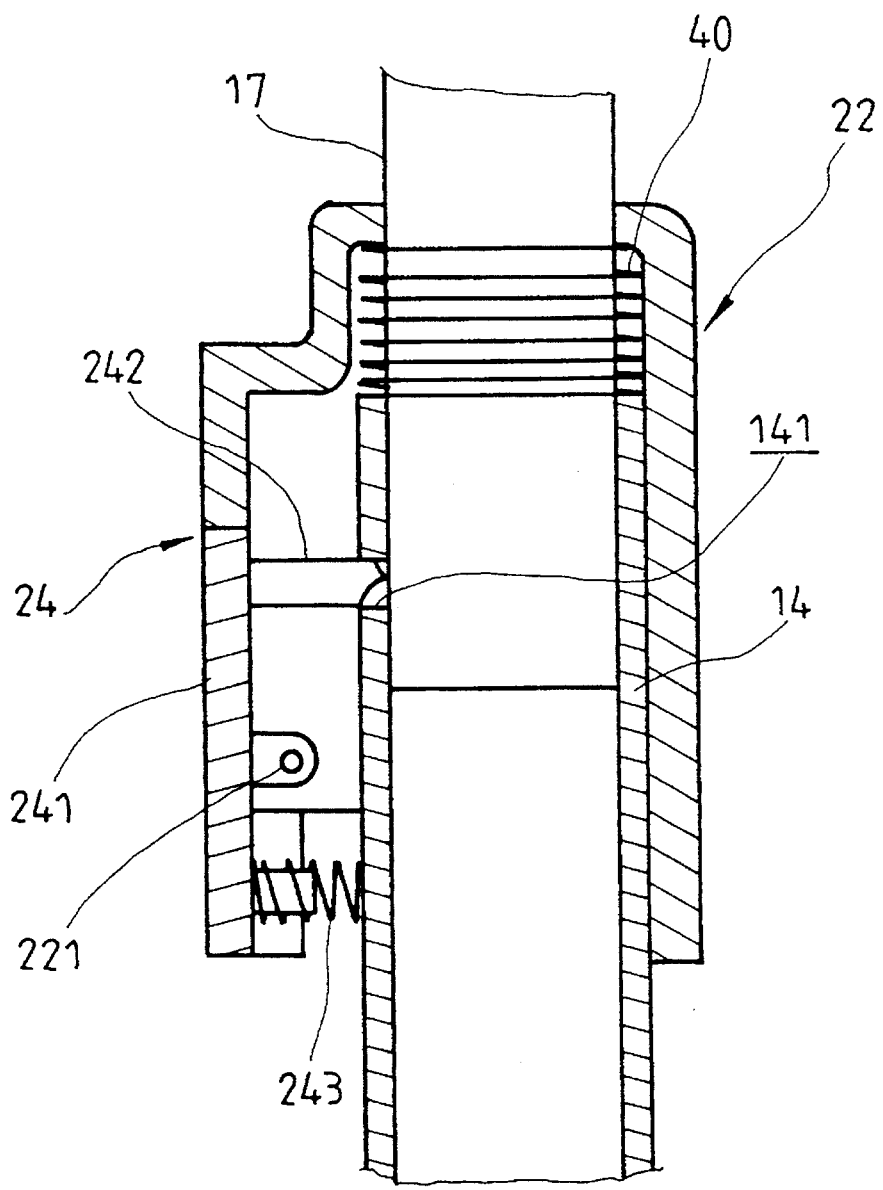
FIG. 5 is a partial cross-sectional view, in a larger scale, showing the anchoring mechanism of the upper support member used in the present luggage trolley.

To secure the upper support member 22 in the trunk-secured position illustrated in FIG. 4, anchoring means 24 is provided on the upper support member 22. With reference to FIG. 5, the anchoring means 24 comprises, associated with each of the first tubular members 14 and 14', a lever 241 pivoted on the upper support member 22 at location designated with reference 221 and biased by a spring 243 to have an anchoring pin 242 penetrate into a pin hole 141 formed on the corresponding first tubular member 14 (or 14'). With such an arrangement, the upper support member 22 is secured in the pre-determined trunk-secured position by the engagement of the anchoring pin 242 with the pin hole 141.

To release the upper support member 22 from the trunk-secured position, the lever 241 is depressed substantially at the location where the biasing spring 243 is supported to withdraw the pin 242 out of the hole 141 and thus freeing the upper support member 22.

To facilitate the release of the upper support member 22, resilient means, such as coil spring 40 encompassing the second tubular member 17 (or 17'), is provided between the upper support member 22 and the first tubular member 14 (or 14') so that when the anchoring pin 242 is disengaged from the hole 141, the upper support member 22 is sprung upward to move away from the trunk-secured position and thus preventing the anchoring pin 242 from entering the hole 141 again.

Figure 6:
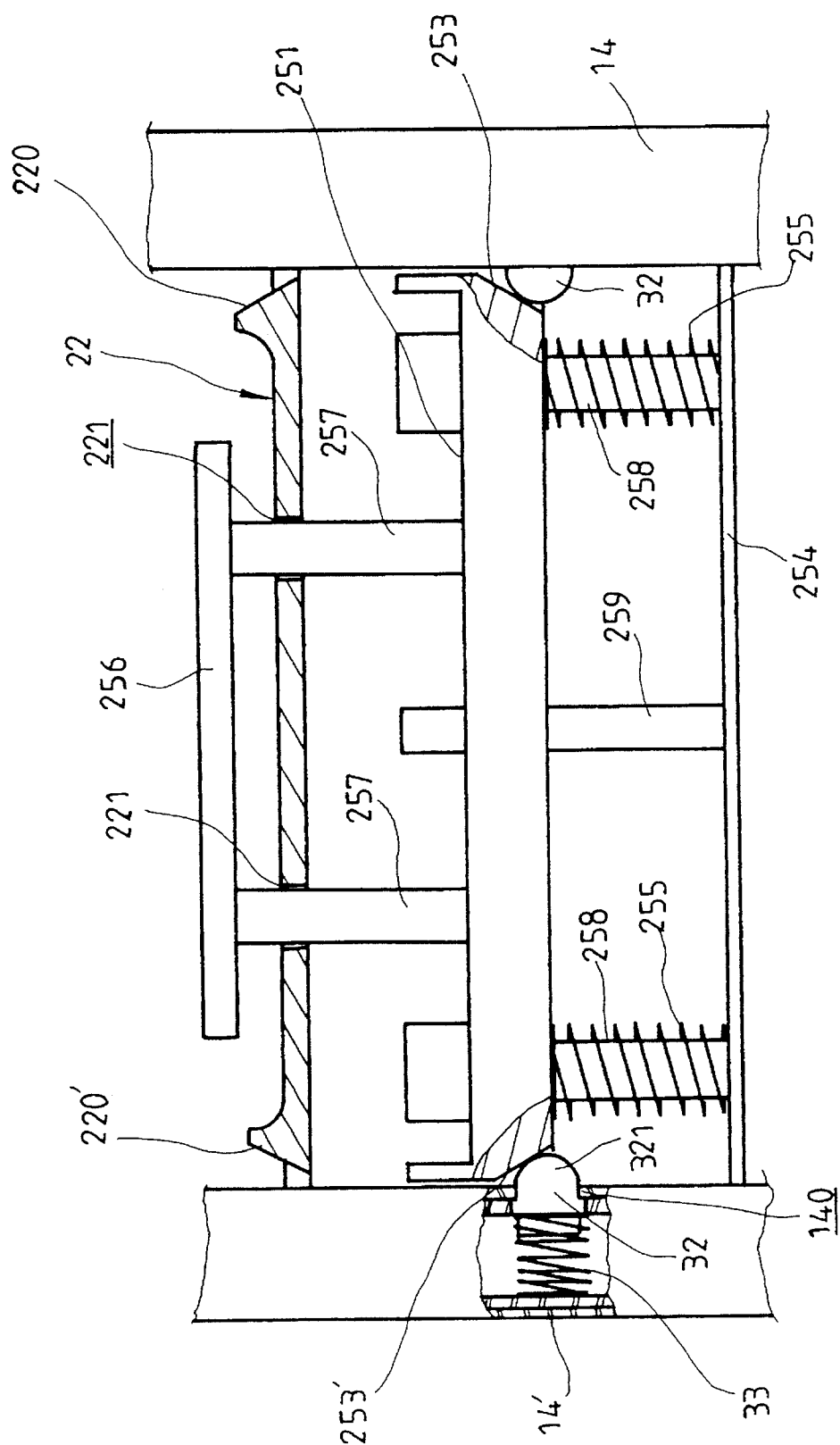
FIG. 6 is a longitudinal sectional view, in a larger scale, showing the upper support member.

With reference to FIG. 6, the upper support member 22 is also provided with releasing means for releasing the connection between the telescopically assembled tubular members 14, 14', 17, 17', 18 and 18'. The releasing means comprises a movable plate 251 disposed within the upper support member 22, which as mentioned previously is a hollow member, and biased by a plurality of springs 255 to move under the guide of guiding rods 258 and 259. The guiding rods 258 also serve to maintain the springs 255 in position. The construction of the guiding rods and the biasing springs is well known so that no further detain is needed herein.

A pushing bar 256 is provided outside the upper support member 22 and is connected to the movable plate 251 with two connection members 257 extending through holes 221 formed on the upper support member 22 to allow the movable plate 251 to be moved by depressing and/or releasing the pushing bar 256.

On the movable plate 251, two first camming surfaces 253 and 253' respectively corresponding to each of the first tubular members 14 and 14' are provided in an inclined manner so that when the movable plate 251 moves downward, the first camming surfaces 253 and 253' respectively act on the round ends of the retaining pins 32 to force the retaining pins 32 to move back into the holes 140 and thus allowing the second tubular members 17 and 17' to be free to slide into the first tubular members 14 and 14'.

Similar to the first camming surfaces 253 and 253', there are second camming surfaces 220 and 220' provided on the upper support member 22 substantially opposite to the first camming surfaces 253 and 253' and inclined in a manner opposite the inclination of the first camming surfaces 253 and 253' so that when the pin engagements between the first tubular members 14, 14' and the second tubular members 17, 17' are released as described above to allow the second tubular members 17 and 17' to move into the first tubular members 14 and 14' and when the pin engagements between the second tubular members 17, 17' and the third tubular members 18, 18' approach the upper support member 22, the second camming surfaces 220 and 220' contact and act on the pins 32' (FIG. 2), which retain the third tubular members in position with respect to the second tubular members, to force the pins 32' to move back and thus allowing the third tubular members 18 and 18' to telescopically move into the second tubular members 17 and 17'. This allows the tubular members 14, 14', 17, 17', 18 and 18' to be telescoped and thus shortening the overall length thereof to save storage space.

It is apparent that although the invention has been described in connection with the preferred embodiment, it is contemplated that those skilled in the art may make changes to certain features of the preferred embodiment without altering the basic concept of the invention and without departing from the spirit and scope of the invention as defined in the appended claims.

What is claimed is:

1. A luggage trolley for carrying a trunk having a predetermined height between an upper side and a lower side thereof, a lower recess and an upper recess being respectively formed on the lower and upper sides of the trunk, said luggage trolley comprising:

a lower support member;

a shaft member extending through said lower support member and having two ends thereof projecting out of said lower support member to have two wheels respectively mounted thereon to rollingly support said lower support member;

a pair of elongated side members respectively attached to and extending from said lower support member with a handle bar mounted between upper ends thereof, at least one said side member having an aperture;

an upper support member extending between said pari of side members and releasably secured thereto at a predetermined position which is substantially distant from said lower support member along the length of said side members;

an anchoring device for releasably securing said upper support member to at least one of said side members, comprising:

a boss member for entering said aperture of said side member when said upper support member is moved to said predetermined position; and a pivotable lever member attached to said upper support member and said boss member and having biasing means disposed between said lever member and said upper support member for providing a biasing force to said lever member;

a lower holding member in the form of an elongated plate attached to said lower support member in such a way as to be receivable within the lower recess formed on the lower side of the trunk; and an upper holding member in the form of an elongated plate attached to said upper support member in such a way as to be receivable within the upper recess formed on the upper side of the trunk;

whereby the distance between the predetermined position where said upper support member is releasably secured and said lower support member being substantially equal to the height of the trunk so that when the truck is placed on said luggage trolley and said upper support member is releasably secured at said predetermined position along said side members, the upper and lower holding members are respectively in engagement with the upper and lower sides of the trunk so as to secure the trunk on said luggage trolley.

* * * * *